(12) United States Patent
Ravichandran et al.

(10) Patent No.: US 11,898,527 B2
(45) Date of Patent: Feb. 13, 2024

(54) SYSTEM AND METHOD FOR CONTROLLING ENGINE STARTING

(71) Applicant: Ford Global Technologies, LLC, Dearborn, MI (US)

(72) Inventors: Maruthi Ravichandran, Dearborn, MI (US); Akshay Bichkar, Ann Arbor, MI (US); Marin Assaliyski, Dearborn, MI (US); Corey James Blue, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/659,098

(22) Filed: Apr. 13, 2022

(65) Prior Publication Data

US 2023/0332569 A1    Oct. 19, 2023

(51) Int. Cl.
| | | |
|---|---|---|
| *F02N 11/08* | (2006.01) | |
| *F16D 48/06* | (2006.01) | |
| *F02N 11/04* | (2006.01) | |
| *F02N 5/00* | (2006.01) | |

(52) U.S. Cl.
CPC ............ *F02N 11/0851* (2013.01); *F02N 5/00* (2013.01); *F02N 11/04* (2013.01); *F02N 11/0859* (2013.01); *F16D 48/06* (2013.01); *F02N 2200/0802* (2013.01); *F02N 2200/101* (2013.01); *F16D 2500/10412* (2013.01); *F16D 2500/306* (2013.01); *F16D 2500/308* (2013.01); *F16D 2500/3144* (2013.01)

(58) Field of Classification Search
CPC ........ F02N 11/0851; F02N 5/00; F02N 11/04; F02N 11/0859; F02N 2200/0802; F02N 2200/101; F16D 48/06; F16D 2500/10412; F16D 2500/306; F16D 2500/308; F16D 2500/3144
See application file for complete search history.

(56) References Cited

U.S. PATENT DOCUMENTS

| | | |
|---|---|---|
| 8,594,913 B2 | 11/2013 | Steuernagel |
| 9,731,710 B2 | 8/2017 | Gibson et al. |
| 10,272,907 B2 | 4/2019 | Johri et al. |

(Continued)

FOREIGN PATENT DOCUMENTS

| | | | | |
|---|---|---|---|---|
| CN | 104160170 A | * | 11/2014 | ............ F16D 48/06 |
| CN | 105636845 A | * | 6/2016 | ............... B60K 6/26 |
| DE | 102010060681 A1 | | 5/2012 | |

OTHER PUBLICATIONS

Ravichandran, M. et al., "Methods and System for Starting an Engine," U.S. Appl. No. 17/443,925, filed Jul. 28, 2021, 35 pages.

(Continued)

*Primary Examiner* — Tisha D Lewis
(74) *Attorney, Agent, or Firm* — David Kelley; McCoy Russell LLP

(57) ABSTRACT

Systems and methods for selecting and scheduling which of a plurality of engine starting devices starts an internal combustion engine of a hybrid vehicle are presented. In one example, a scheduled start of the internal combustion engine via a driveline disconnect clutch is withdrawn during conditions when both a transmission gear shift is requested or in process and when a driver urgency level is greater than a threshold level.

10 Claims, 4 Drawing Sheets

(56) References Cited

U.S. PATENT DOCUMENTS

| | | | |
|---|---|---|---|
| 10,450,979 B2 | 10/2019 | Gibson et al. | |
| 11,168,657 B2 * | 11/2021 | Banker | F02D 41/38 |
| 2013/0296121 A1 | 11/2013 | Gibson et al. | |
| 2017/0259808 A1 | 9/2017 | Makled et al. | |
| 2017/0259810 A1 | 9/2017 | Zhang et al. | |
| 2017/0341639 A1 | 11/2017 | Nefcy et al. | |
| 2018/0244262 A1 * | 8/2018 | Ruybal | B60W 10/113 |
| 2018/0251117 A1 | 9/2018 | Yamazaki et al. | |
| 2018/0306157 A1 | 10/2018 | Lee et al. | |
| 2018/0340503 A1 | 11/2018 | Kim | |
| 2019/0176809 A1 * | 6/2019 | Meyer | B60W 10/08 |
| 2019/0376483 A1 | 12/2019 | Khafagy et al. | |
| 2020/0080527 A1 | 3/2020 | Khafagy et al. | |
| 2021/0086775 A1 * | 3/2021 | Blue | B60W 10/08 |
| 2021/0300316 A1 * | 9/2021 | Doering | B60W 30/192 |
| 2022/0097677 A1 * | 3/2022 | Meyer | B60W 20/40 |

OTHER PUBLICATIONS

Ravichandran, M. et al., "Methods and System for Controlling an Engine," U.S. Appl. No. 17/449,209, filed Sep. 28, 2021, 42 pages.
Ravichandran, M. et al., "Methods and System for Reserving Torque for Engine Starting," U.S. Appl. No. 17/449,216, filed Sep. 28, 2021, 41 pages.

* cited by examiner

SYSTEM AND METHOD FOR CONTROLLING ENGINE STARTING

FIELD

The present description relates to methods and a system for providing smooth driveline operation during transmission gear shifting and engine starting.

BACKGROUND AND SUMMARY

A hybrid vehicle may include several different ways to start an engine of the hybrid vehicle. For example, the engine of a hybrid vehicle may be started via a flywheel starter when the vehicle is cold started. On the other hand, the engine of the hybrid vehicle may be started via closing a driveline disconnect clutch so that an integrated starter/generator (ISG) may start the engine during conditions when the hybrid vehicle is traveling on a road. It may be desirable to start the engine of the hybrid vehicle by closing a driveline disconnect clutch when the vehicle is traveling on a road because the ISG may have more available torque to start the engine as compared to the flywheel starter. The additional available torque may be utilized to increase a speed of the engine to the speed of the ISG sooner so that driveline response and performance may be improved. Nevertheless, if the engine is being started via closing the driveline disconnect clutch when a transmission is in the process of shifting gears, the simultaneous engine starting and gear shifting may cause driveline torque disturbances due to uncertainty in driveline disconnect clutch torque capacity, changes in torque that is transferred through the driveline disconnect clutch, and a change in transmission input inertia. Therefore, it may be desirable to provide a way of starting an engine of a hybrid vehicle during transmission shifting that may reduce a possibility of driveline torque disturbances.

The inventors herein have recognized the above-mentioned issues and have developed a method for operating a vehicle, comprising: via a controller, scheduling starting of an internal combustion engine of the vehicle via closing a driveline disconnect clutch while a transmission gear shift is requested or in progress; and via the controller, delaying starting of the internal combustion engine via the driveline disconnect clutch and completing the transmission gear shift while a driver urgency level is less than a threshold level.

By delaying engine starting via closing a driveline disconnect clutch when a transmission gear shift is requested or in progress, it may be possible to reduce driveline torque disturbances that may be related to starting an engine. Specifically, it may be possible to reduce transmission clutch slipping and/or abrupt transmission clutch closing conditions that may disturb torque flow through a driveline by preventing a driveline disconnect clutch from fully closing while a transmission gear shift is requested and/or in progress. Consequently, torque transfer through the driveline and vehicle drivability may be improved.

The present description may provide several advantages. In particular, the approach may improve hybrid driveline operation during transmission gear shifting. Further, the approach may reduce driveline torque disturbances. Additionally, the approach may improve a vehicle's response and drivability.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
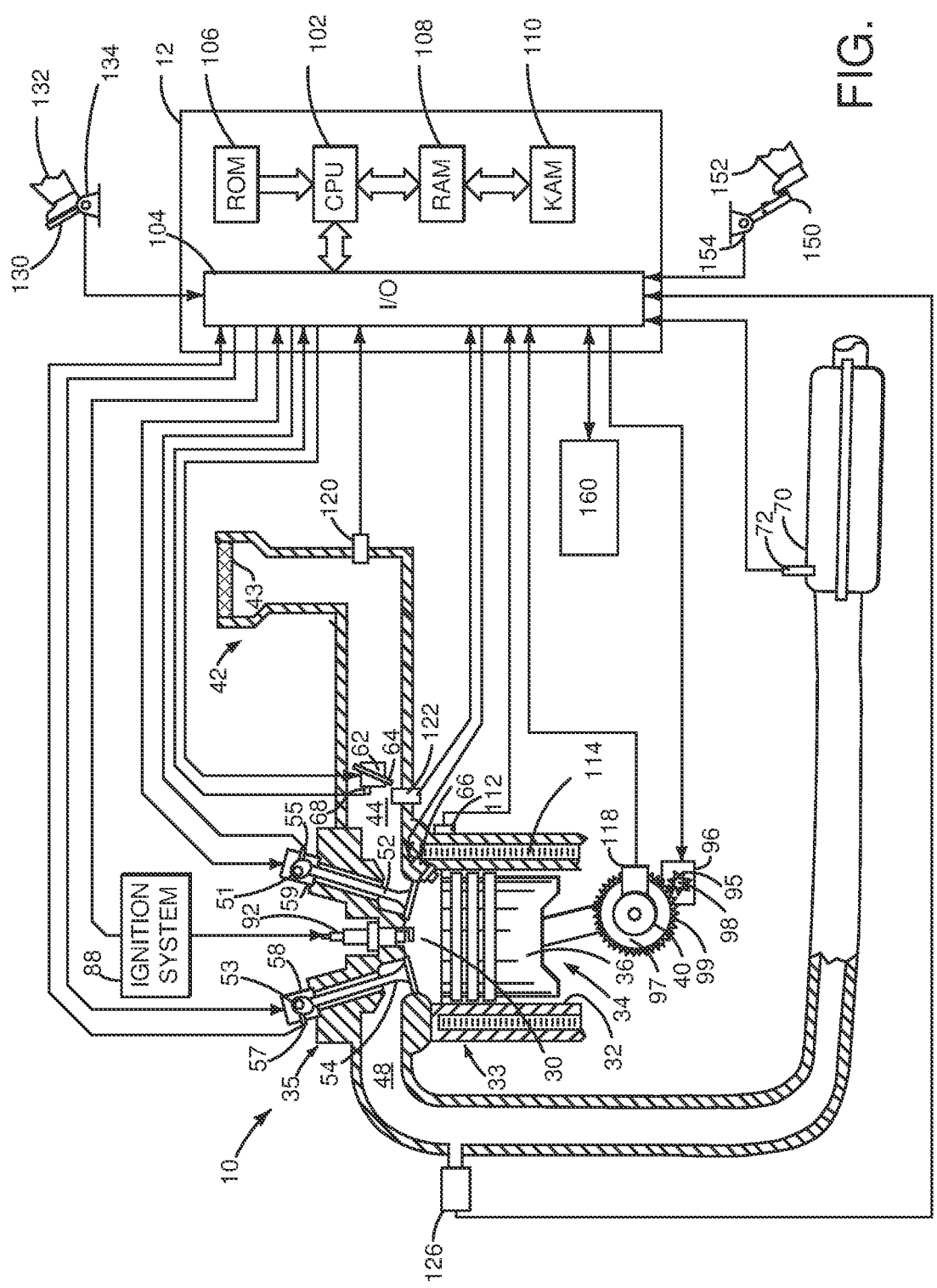
FIG. 1 is a schematic diagram of an engine.
Figure 2:
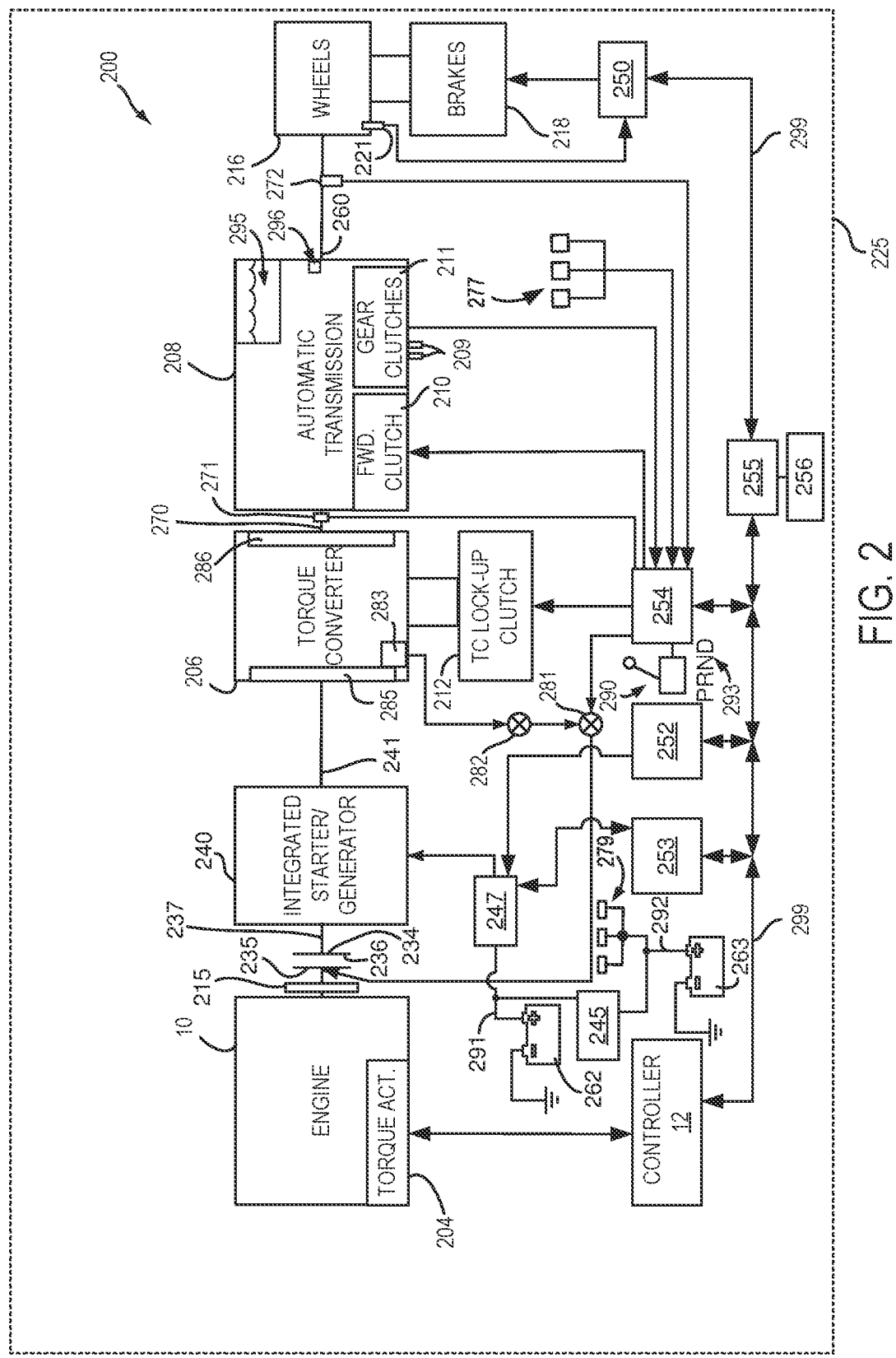
FIG. 2 is a schematic diagram of a hybrid vehicle driveline including the engine of FIG. 1.
Figure 3:
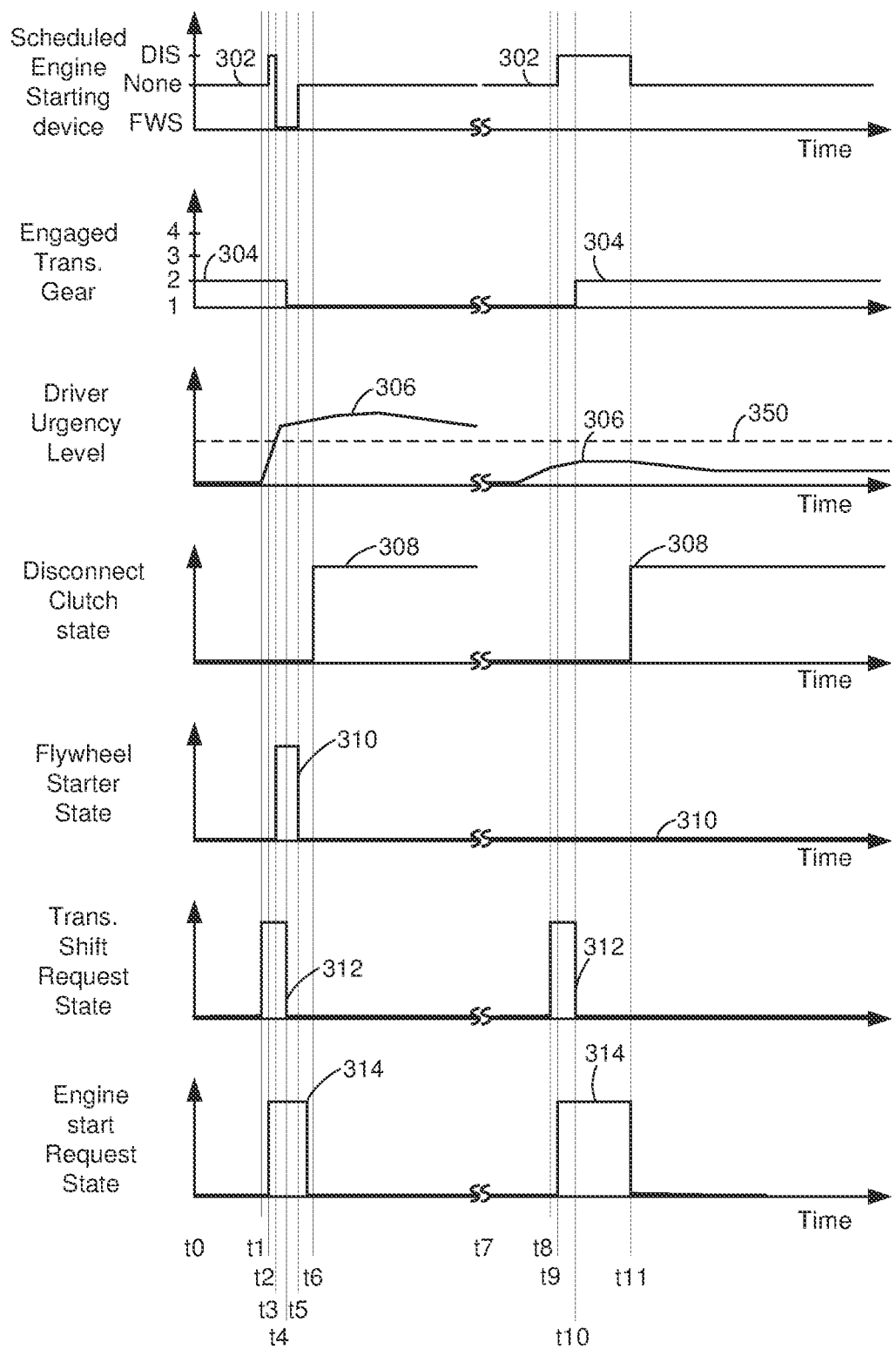
FIG. 3 shows example engine starting sequences according to the method of FIG. 4.
Figure 4:
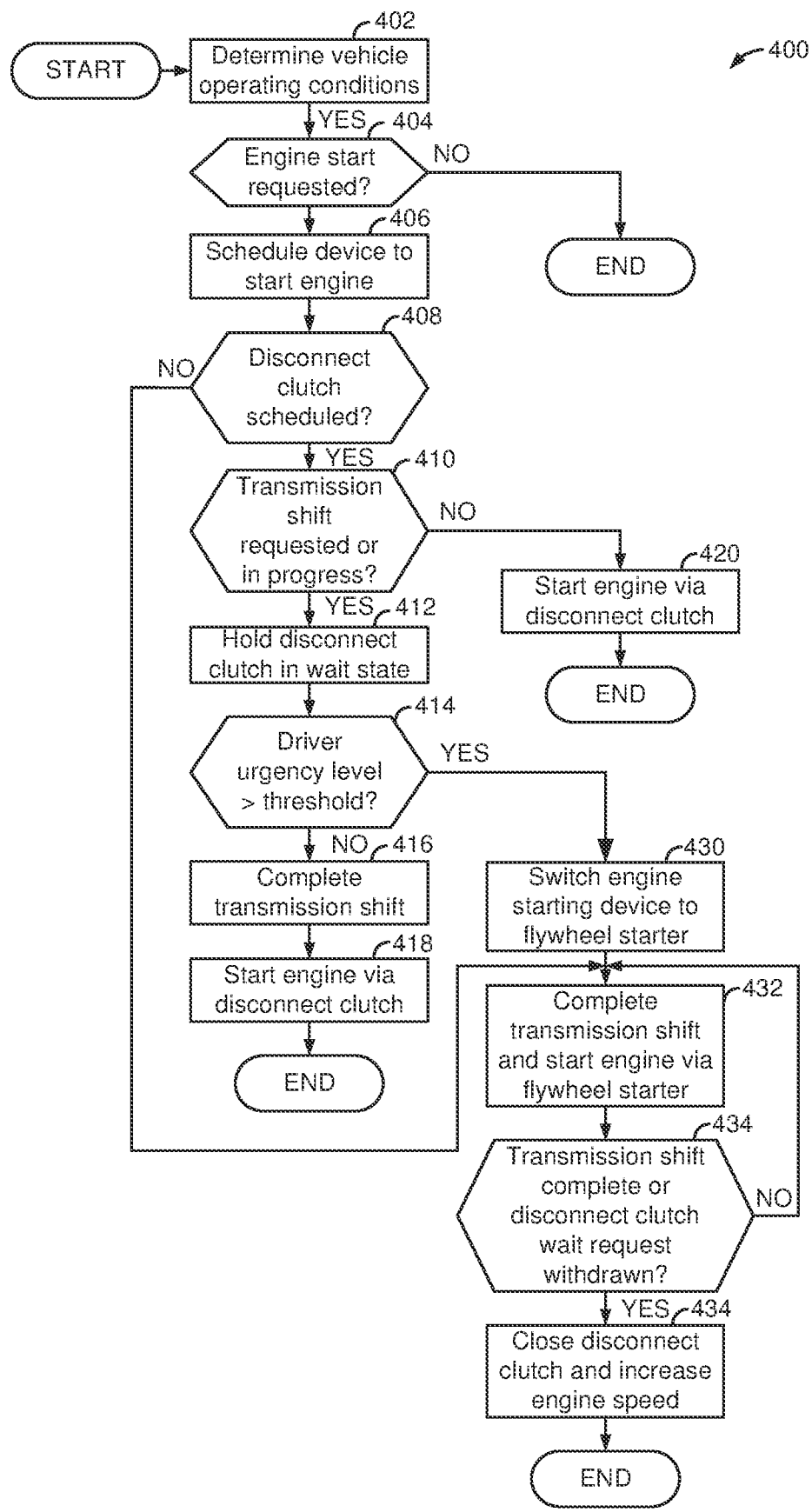
FIG. 4 shows a method for starting an engine of a hybrid vehicle.

The present description is related to improving engine starting of a hybrid vehicle. In particular, starting of an engine may be delayed, or alternatively, a different engine starting device may be selected and/or scheduled when a transmission gear shift is requested and/or is in process while an engine start is requested. The engine may be of the type that is shown in FIG. 1. The engine may be part of a hybrid powertrain or driveline as shown in FIG. 2. An operating sequence according to the methods of FIG. 4 is shown in FIG. 3. FIG. 4 show a flowchart of methods for controlling engine starting when shifting a transmission gear.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electromechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the TCC is locked. The TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; a transmission included in the driveline; and a controller including executable instructions stored in non-transitory memory that cause the controller to place operation of the disconnect clutch in a wait state, where a torque capacity of the disconnect clutch is constrained below a threshold value, while a gear shift of the transmission is requested and while the disconnect clutch is scheduled to start the internal combustion engine. In a first example, the system further comprises additional instructions to start the internal combustion engine via closing the disconnect clutch in response to the gear shift completing. In a second example that may include the first example, the system further comprises additional instructions to schedule starting of the internal combustion engine via a flywheel starter in response to a driver urgency level exceeding a threshold level. In a third example that may include one or both of the first and second examples, the system further comprises additional instructions to close the driveline disconnect clutch in response to the gear shift being complete. In a fourth example that may include one or more of the first through third examples, the system further comprises additional instructions to close the driveline disconnect clutch in response to the disconnect clutch exiting the wait state. In a fifth example that may include one or more of the first through fourth examples, the system includes where the disconnect clutch exits the wait state in response to the internal combustion engine being started. In a sixth example that may include one or more of the first through fifth examples, the system further comprises additional instructions to schedule the disconnect clutch to start the engine before the disconnect clutch is placed in the wait state.

Referring now to FIG. 3, a prophetic driveline operating sequence is shown. The operating sequence of FIG. 3 may be provided via the system of FIGS. 1 and 2 in cooperation with the methods of FIG. 4. The vertical lines at times t0-t11 represent times of interest during the operating sequence. The plots are time aligned.

The first plot from the top of FIG. 3 is a plot of a scheduled engine starting device (e.g., an engine starting device that is planned or expected to start the internal combustion engine) versus time. The vertical axis represents the scheduled engine starting device and the scheduled engine starting device may be the driveline disconnect clutch (DIS), none, or the flywheel starter (FWS). The horizontal axis represents time and time increases from the left side of the plot to the right side of the plot. Trace 302 represents the scheduled engine starting device.

The second plot from the top of FIG. 3 is a plot of engaged transmission gear versus time. The vertical axis represents the engaged transmission gear and the engaged transmission gear may be $1^{st}$ (1) $2^{nd}$ (2), $3^{rd}$ (3), or $4^{th}$ (4). The horizontal axis represents time and time increases from the left side of the plot to the right side of the plot. Trace 304 represents the engaged transmission gear.

The third plot from the top of FIG. 3 is a driver urgency value versus time. The vertical axis represents the driver urgency value and the driver urgency value increases in the direction of the vertical axis arrow. The driver urgency value increases in the direction of the vertical axis arrow for increasingly urgent conditions (e.g., conditions where the vehicle driver wants to move the vehicle). The horizontal axis represents time and time increases from the left side of the plot to the right side of the plot. Trace 306 represents the driver urgency value. A horizontal line represents a driver urgency threshold value 350 that when exceeded by the driver urgency value may result in a change in the scheduled engine starting device.

The fourth plot from the top of FIG. 3 is a plot of a driveline disconnect clutch state versus time. The vertical axis represents the driveline disconnect clutch state and the driveline disconnect clutch is disengaged when trace 308 is at a lower level near the horizontal axis. The driveline disconnect clutch is fully engaged when trace 308 is at a higher level near the vertical axis arrow. The horizontal axis represents time and time increases from the left side of the plot to the right side of the plot. Trace 306 represents the driveline disconnect clutch state.

The fifth plot from the top of FIG. 3 is a plot of a flywheel starter state versus time. The vertical axis represents the flywheel starter state and the flywheel starter is disengaged when trace 310 is at a lower level near the horizontal axis. The flywheel starter is fully engaged and cranking the engine when trace 310 is at a higher level near the vertical axis arrow. The horizontal axis represents time and time increases from the left side of the plot to the right side of the plot. Trace 310 represents the flywheel starter state.

The sixth plot from the top of FIG. 3 is a plot of a transmission gear shift request state versus time. The vertical axis represents the transmission gear shift request state and a transmission gear shift is not requested when trace 312 is at a lower level near the horizontal axis. The transmission gear shift request is asserted when trace 312 is at a higher level near the vertical axis arrow. The horizontal axis represents time and time increases from the left side of the plot to the right side of the plot. Trace 312 represents the transmission gear shift request state.

The seventh plot from the top of FIG. 3 is a plot of an engine start request state versus time. The vertical axis represents the engine start request state and the engine start request is not asserted when trace 314 is at a lower level near the horizontal axis. The engine start request is asserted when trace 314 is at a higher level near the vertical axis arrow. The horizontal axis represents time and time increases from the left side of the plot to the right side of the plot. Trace 314 represents the engine start request state.

At time t0, the engine is not started nor is it scheduled to be started. The transmission is engaged in second gear. The vehicle is being propelled via the electric machine or ISG 240 (not shown) and the driver urgency value is low. The driveline disconnect clutch is fully open and the flywheel starter is not engaged. The transmission gear shift request is not asserted so a transmission gear shift is not requested and not in progress. The engine start request is not asserted.

At time t1, the vehicle operator (not shown) begins to apply the driver demand pedal (not shown) so that the driver urgency level begins to increase. The transmission shift request is asserted so that the transmission may downshift to increase the rate of change in vehicle speed (not shown). The engaged transmission gear is second gear. The flywheel starter is not engaged and the engine start request is not asserted. The driveline disconnect clutch remains fully open.

At time t2, the engine start request is asserted. The engine start request may be asserted based on a low battery state of charge, the driver demand torque or power, or other vehicle operating conditions. The transmission shift request remains asserted and the engaged transmission gear remains second gear. The driver urgency level continues to increase and the driveline disconnect clutch is scheduled to start the engine. However, the driveline disconnect clutch enters a wait state (not shown) where torque capacity of the driveline disconnect clutch is constrained to less than a threshold torque capacity (e.g., less than 20 Newton-meters). The driveline disconnect clutch remains open and the flywheel starter is not engaged.

At time t3, the driver urgency value or level exceeds driver urgency threshold value 350, which causes the scheduled engine starting device to change to the flywheel starter so that the ISG may continue to meet driver demand while the engine is started via the flywheel starter. The engine start request remains asserted and the transmission shift request remains asserted. The transmission shift is in progress (not shown) and the flywheel starter changes to an asserted state to indicate that the flywheel starter is engaging the engine flywheel (not shown). The driveline disconnect clutch state remains not asserted to indicate that the driveline disconnect clutch remains open.

At time t4, the transmission gear shift completes a shift from second gear to first gear. The flywheel starter state remains asserted to indicate that the flywheel is engaged to start the engine. The driveline disconnect clutch remains open and the driver urgency value or level continues to increase. The engine start request remains asserted and the transmission shift request reverts to not asserted in response to the transmission gear shift completing.

At time t5, the engine is started (not shown) and the flywheel starter state changes to not asserted. The transmission shift state is not asserted and the engine start request changes to not asserted shortly after time t5. The scheduled engine starting device changes back to none since the engine is now started. The transmission remains in first gear and the driver urgency level increases at a slower rate. The driveline disconnect clutch state remains not asserted so the driveline disconnect clutch is not completely closed, but it is in the process of closing since the engine is started and since the transmission gear shift is complete.

At time t6, the driveline disconnect clutch is fully closed as indicated by the driveline disconnect clutch changing to an asserted state. An engine starting device is not scheduled and the transmission remains engaged in first gear. The driver urgency level increases at a slow rate and the flywheel starter is not engaged. The transmission shift request is not asserted and the engine start request is not asserted.

Between time t6 and time t7, a break in the sequence occurs. The time duration of the brake may be long or short. The sequence continues at time t7 where no engine starting device is scheduled to start the engine and where the transmission is engaged in first gear. The driver urgency value or level begins to increase shortly after time t7 and the driveline disconnect clutch is open. The engine is not started and the engine start request is not asserted.

At time t8, the transmission shift request is asserted and no engine starting device is scheduled to start the engine. The transmission begins to shift in response to the transmission shift request. The transmission shift process may include reducing pressure of a first transmission clutch to disengage a first transmission gear and increasing pressure in a second transmission clutch to engage a second transmission gear. The transmission is engaged in first gear and the driver urgency level is increasing. The driveline disconnect clutch state is not asserted and the driveline disconnect clutch is open. The flywheel starter is not engaged and the engine start request is not asserted.

At time t9, the engine start request is asserted and the driveline disconnect clutch is scheduled to start the engine. The engine start request may be generated in response to low battery state of charge, driver demand torque or power, or other vehicle operating conditions. The transmission remains engaged in first gear and the driver urgency value or level continues to increase. The driveline disconnect clutch remains open and the flywheel starter is not engaged. The transmission shift request remains asserted. Operation of the driveline disconnect clutch is placed in a wait state where torque capacity of the driveline disconnect clutch is constrained to be less than a threshold torque transfer capacity (e.g., 20 Newton-meters). By placing operation of the driveline disconnect clutch in a wait state, shifting of the transmission may complete before the input inertia of the transmission changes so that a possibility of driveline torque disturbances may be reduced.

At time t10, the transmission gear shift completes and second gear is engaged. Therefore, the transmission shift request is withdrawn. The driveline disconnect clutch remains as the scheduled engine starting device and the driver urgency value or level remains below driver urgency threshold value 350. The driveline disconnect clutch exits from the wait state and the driveline disconnect clutch begins to close to start the engine. The engine start request remains asserted and the flywheel starter remains disengaged. The transmission shift request is withdrawn.

At time t11, the driveline disconnect clutch fully closes and the engine is started (not shown). The engine start request is withdrawn and the scheduled engine starting device reverts back to none. The driver urgency value or level begins to decrease slowly. The flywheel starter remains disengaged. The transmission shift request is not asserted.

In this way, a scheduled engine starting device may be changed for an engine start where a transmission gear shift is present so that starting the engine may meet urgency requirements while reducing the possibility of driveline torque disturbances. However, the scheduled engine starting device may remain unchanged once the engine is scheduled to be started when driver urgency values or levels are low so that torque of the ISG may be applied to start the engine, thereby reducing flywheel starter wear.

Referring now to FIG. 4, a method for operating an engine of a hybrid vehicle is shown. The method of FIG. 4 may be at least partially implemented as executable instructions stored in controller memory in the system of FIGS. 1 and 2. Further, the method of FIG. 4 may include actions taken in the physical world to transform an operating state of the system of FIGS. 1 and 2. Additionally, the method of FIG. 4 may provide at least portions of the operating sequence shown in FIG. 3.

At 402, method 400 determines vehicle operating conditions. Vehicle operating conditions may include but are not limited to vehicle speed, driver demand torque or power, driver urgency level, and state of battery charge. Method 400 proceeds to 404.

At 404, method 400 judges whether or not an engine start is requested. An engine start may be requested in response to a driver demand torque or power request that is generated via a driver applying the driver demand pedal, battery state of charge, an emission system temperature, a level of stored fuel vapor, and other vehicle operating conditions. If method 400 judges that an engine start is requested, the answer is yes and method 400 proceeds to 406. Otherwise, the answer is no and method 400 proceeds to exit.

At 406, method 400 selects and schedules a device for starting the internal combustion engine. In one example, method 400 determines vehicle operating conditions and references columns in a data selection matrix or data structure. The data structure or data selection matrix includes cells and the cells of columns may include parameters (e.g., X's) that link the vehicle operating considerations with the engine starting devices. To determine which engine starting device is activated to start the engine when a particular set of vehicle operating considerations are present, method 400 references the data structure or matrix via the present vehicle operating considerations and queries cells in the matrix that correspond to columns where the vehicle operating consideration is active. Based on the cells that contain parameters, method 400 determines a single row and the engine starting devices are selected according to the single row. In other words, method 400 references cells in the data selection matrix or data structure via columns, and contents of the cells indicate which individual row of the data matrix or data structure is relevant for the present vehicle operating conditions. The selected and scheduled engine starting device is determined from the individual row since an individual engine starting device is assigned to each row. In this example, method 400 may select a driveline disconnect clutch as the engine starting device or method 400 may select the flywheel starter as the engine starting device. It should be noted that when the driveline disconnect clutch is selected as the engine starting device, torque to start the engine may be provided via the ISG or the vehicle's inertia through the driveline disconnect clutch and to the engine. Method 400 proceeds to 408 after the engine starting device is selected.

At 408, method 400 judges whether or not the driveline disconnect clutch is scheduled to start the internal combustion engine. Scheduling the driveline disconnect clutch to start the engine may include determining a time at which the driveline disconnect clutch is to begin closing. The time that the driveline disconnect clutch begins to close may be a function of driver demand torque, vehicle speed, and other vehicle conditions. If method 400 judges that the driveline disconnect clutch has been selected to start the internal combustion engine, the answer is yes and method 400 proceeds to 410. Otherwise, the answer is no and method 400 proceeds to 432.

At 410, method 400 judges whether or not a transmission gear shift is requested or in progress. A transmission gear shift may be requested in response to vehicle speed and driver demand torque or power. Gears may be engaged and disengaged according to a gear shifting schedule that is referenced by driver demand torque or power and vehicle speed. The transmission may be shifted according to a first gear shift schedule for upshifts and a second gear shift schedule for downshifts. For example, a transmission gear shift from first gear to second gear may be requested when vehicle speed is 15 kilometers/hour and when driver demand torque is less than 50 Newton-meters of wheel torque. A transmission gear shift may be requested and the gear shift request may be followed by the actual gear shift. The transmission gear shift request may be withdrawn after the transmission gear shift is complete. A gear shift is in progress beginning from a time when an off going clutch of a first gear begins to be released from a closed state to a time when an oncoming clutch of a gear that is being engaged fully closes after the oncoming clutch was open. If method 400 judges that a transmission gear shift has been requested or is in progress, the answer is yes and method 400 proceeds to 412. Otherwise, the answer is no and method 400 proceeds to 420.

At 420, method 400 starts the engine via the driveline disconnect clutch. In one example, method 400 starts the engine via partially closing the driveline disconnect clutch so that the engine is rotated at a requested speed. The driveline disconnect clutch may be commanded to provide a predetermined torque capacity (e.g., a maximum amount of torque that the driveline disconnect clutch may transfer) during engine starting. Method 400 supplies fuel to the engine and spark to the engine. The driveline disconnect clutch may be fully closed once the engine is started. Method 400 proceeds to exit.

At 412, method 400 places operation of the driveline disconnect clutch in a wait state where torque capacity (e.g., the maximum amount of torque that the driveline disconnect clutch may transfer) of the driveline disconnect clutch is constrained or held below a threshold torque capacity. Method 400 may constrain or limit the driveline disconnect clutch torque capacity by constraining pressure of fluid to closed the driveline disconnect clutch. In one example, the driveline disconnect clutch torque capacity is constrained to be less than 20 Newton-meters so that input inertia of the transmission may be limited, thereby reducing a possibility of driveline torque disturbances during transmission shifting. Method 400 proceeds to 414 after operation of the driveline disconnect clutch enters the wait state.

At 414, method 400 judges whether or not a driver urgency level is greater than a threshold driver urgency level. In one example, the controller may determine a level of driver urgency based on the rate of change in the driver demand pedal and the present driver demand pedal position. For example, if the rate of driver demand pedal change is less than a first threshold and the driver demand pedal is applied 2% of full scale, the driver urgency level may be a numerical value of ten. However, if the rate of driver demand pedal change is greater than the first threshold and the driver demand pedal is applied 20% of full scale, the driver urgency level may be a numerical value of forty. The driver demand value may be determined as a sum of values that are looked up from tables or functions that are referenced by rate of driver demand pedal change and driver demand pedal position. If method 400 judges that the driver urgency level is greater than a threshold urgency level, the answer is yes and method 400 proceeds to 430. Otherwise, the answer is no and method 400 proceeds to 416.

At 416, method 400 completes the transmission gear shift that is requested or in progress. Method 400 completes the transmission gear shift via reducing pressure in an off-going clutch to release the old gear. Method increases pressure in an on-coming clutch to engage the new gear. Method 400 proceeds to 418.

At 418, method 400 judges whether or not the transmission gear selector is in the reverse position. If so, the answer is yes and method 400 proceeds to 418. Otherwise, the answer is no and method 400 proceeds to 420.

Thus, method 400 may proceed to 416 when the transmission is expected to be engaged in a forward gear or reverse gear such that the load on the torque converter turbine may begin to affect engine speed. These conditions may make it favorable to change the requested engine speed from engine idle speed for neutral or engine idle speed for park to engine idle speed for drive (may be referred to as drive engine idle speed) or engine idle speed for reverse (may be referred to as reverse engine idle speed).

At 420, method 400 starts the engine via the driveline disconnect clutch. In one example, method 400 starts the engine via partially closing the driveline disconnect clutch so that the engine is rotated at a requested speed. The driveline disconnect clutch may be commanded to provide a predetermined torque capacity (e.g., a maximum amount of torque that the driveline disconnect clutch may transfer) during engine starting. Partially closing the driveline disconnect clutch transfers torque from the ISG to the engine and the engine is rotated. Method 400 supplies fuel to the engine and spark to the engine while the engine is rotated. The driveline disconnect clutch may be fully closed once the engine is started. Method 400 proceeds to exit.

At 430, method 400 switches or changes the scheduled engine starting device from the driveline disconnect clutch to the flywheel starter. Method 400 changes the scheduled engine starting device so that vehicle drivability may be improved. Changing the scheduled engine starting device may allow the ISG to provide additional torque during the transmission gear shift so that driver demand torque may be met before and after the transmission gear shift. Since the driveline disconnect clutch is in the wait state, operation of the driveline disconnect clutch is not interrupted or interfered with. Method 400 proceeds to 434.

At 434, method 400 judges if the transmission gear shift is complete or if operation of the driveline disconnect clutch in the wait state has been withdrawn. Operation of the driveline disconnect clutch in the wait state may be withdrawn if the engine is started. In some examples, operation of the driveline disconnect clutch in the wait state may be withdrawn when the engine is started and when the engine speed is within a threshold speed (e.g., 50 RPM) of ISG speed. If method 400 judges that the transmission shift is complete or operation of the driveline disconnect clutch in the wait state is withdrawn, the answer is yes and method 400 proceeds to 434. Otherwise, the answer is no and method 400 returns to 432.

At 434, method 400 closes the driveline disconnect clutch and increases engine speed to match speed of the ISG. If the engine has not been started via the flywheel starter, the flywheel starter may be disengaged from the engine. If the engine is started, the flywheel starter is disengaged from the engine. Method 400 proceeds to exit.

In this way, method 400 may switch between engine starting devices to improve vehicle drivability. In addition, method 400 assigns a higher priority to shifting a transmission gear so that gear shifting may not be interrupted, but method 400 may start the engine while the transmission is shifting gears so that torque may be provided by the engine sooner than if starting of the engine were delayed by waiting to close the driveline disconnect clutch.

Thus, method 400 provides for a method for operating a vehicle, comprising: via a controller, scheduling starting of an internal combustion engine of the vehicle via closing a driveline disconnect clutch while a transmission gear shift is requested or in progress; and via the controller, delaying starting of the internal combustion engine via the driveline disconnect clutch and completing the transmission gear shift while a driver urgency level is less than a threshold level. In a first example, the method includes where delaying engine starting of the internal combustion engine includes placing closing of the driveline disconnect clutch in a wait state where a torque capacity of the driveline disconnect clutch is constrained below twenty Newton-meters. In a second example that may include the first example, the method includes where the driver urgency level is based on a rate of change of a driver demand pedal. In a third example that may include one or both of the first and second examples, the method further comprises starting the internal combustion engine via closing the driveline disconnect clutch in response to completing the transmission gear shift. In a fourth example that may include one or more of the first through third examples, the method further comprises cancelling starting of the internal combustion engine via the driveline disconnect clutch in response to the driver urgency level being greater than the threshold level. In a fifth example that may include one or more of the first through fourth examples, the method further comprises starting of the internal combustion engine via a flywheel starter in response to the driver urgency level being greater than the threshold level. In a sixth example that may include one or more of the first through fifth examples, the method further comprises closing the driveline disconnect clutch in response to cancelling starting of the internal combustion engine via the driveline disconnect clutch and the driveline disconnect clutch exiting the wait state. In a seventh example that may include one or more of the first through sixth examples, The method includes where the driveline disconnect clutch exits the wait state in response to the internal combustion engine being started.

Method 400 also provides for a method for operating a vehicle, comprising: via a controller, adjusting which of a plurality of engine starting devices starts an internal combustion engine during a transmission gear shift in response to a driver urgency level. In a first example, the method includes where a driveline disconnect clutch starts the internal combustion engine when the driver urgency level is less than a threshold level. In a second example that may include the first example, the method includes where a flywheel starter starts the internal combustion engine when the driver urgency level is greater than the threshold level. In a third example that may include one or both of the first and second examples, the method further comprises closing a driveline disconnect clutch in response to the transmission gear shift being complete. In a fourth example that may include one or more of the first through third examples, the method further comprises scheduling a driveline disconnect clutch to start the internal combustion engine prior to adjusting which of the plurality of engine starting devices starts the internal combustion engine.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
via a controller, scheduling starting of an internal combustion engine of the vehicle via closing a driveline disconnect clutch while a transmission gear shift is requested or in progress;
via the controller, delaying starting of the internal combustion engine via the driveline disconnect clutch and completing the transmission gear shift while a driver urgency level is less than a threshold level, where delaying engine starting of the internal combustion engine includes placing closing of the driveline disconnect clutch in a wait state where a torque capacity of the driveline disconnect clutch is constrained below twenty Newton-meters, where the driver urgency level is based on a rate of change of a driver demand pedal; and
cancelling starting of the internal combustion engine via the driveline disconnect clutch in response to the driver urgency level being greater than the threshold level.

2. The method of claim 1, further comprising starting of the internal combustion engine via a flywheel starter in response to the driver urgency level being greater than the threshold level.

3. The method of claim 2, further comprising closing the driveline disconnect clutch in response to cancelling starting of the internal combustion engine via the driveline disconnect clutch and the driveline disconnect clutch exiting the wait state.

4. The method of claim 3, where the driveline disconnect clutch exits the wait state in response to the internal combustion engine being started.

5. A system, comprising:
an internal combustion engine;
an integrated starter/generator;
a disconnect clutch positioned in a driveline between the internal combustion engine and the integrated starter/generator;
a transmission included in the driveline; and
a controller including executable instructions stored in non-transitory memory that cause the controller to place operation of the disconnect clutch in a wait state, where a torque capacity of the disconnect clutch is constrained below a threshold value, while a gear shift of the transmission is requested and while the disconnect clutch is scheduled to start the internal combustion engine, and additional executable instructions to schedule starting of the internal combustion engine via a flywheel starter in response to a driver urgency level exceeding a threshold level, and additional instructions to cancelling starting of the internal combustion engine via the driveline disconnect clutch in response to the driver urgency level being greater than the threshold level.

6. The system of claim 5, further comprising additional instructions to start the internal combustion engine via closing the disconnect clutch in response to the gear shift completing.

7. The system of claim 5, further comprising additional instructions to close the disconnect clutch in response to the gear shift being complete.

8. The system of claim 5, further comprising additional instructions to close the disconnect clutch in response to the disconnect clutch exiting the wait state.

9. The system of claim 8, where the disconnect clutch exits the wait state in response to the internal combustion engine being started.

10. The system of claim 5, further comprising additional instructions to schedule the disconnect clutch to start the internal combustion engine before the disconnect clutch is placed in the wait state.

* * * * *